(12) United States Patent
Wang et al.

(10) Patent No.: US 10,921,655 B2
(45) Date of Patent: Feb. 16, 2021

(54) PIXEL STRUCTURE HAVING MULTIPLE STRIP ELECTRODES

(71) Applicants: CHONGQING BOE OPTOELECTRONICS TECHNOLOGY CO., LTD., Chongqing (CN); BOE TECHNOLOGY GROUP CO., LTD., Beijing (CN)

(72) Inventors: Xiaoyuan Wang, Beijing (CN); Ni Yang, Beijing (CN); Yan Fang, Beijing (CN); Hengyi Xu, Beijing (CN); Yunze Li, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/473,970

(22) PCT Filed: Sep. 14, 2018

(86) PCT No.: PCT/CN2018/105738
§ 371 (c)(1),
(2) Date: Jun. 26, 2019

(87) PCT Pub. No.: WO2019/056992
PCT Pub. Date: Mar. 28, 2019

(65) Prior Publication Data
US 2019/0339576 A1 Nov. 7, 2019

(30) Foreign Application Priority Data
Sep. 22, 2017 (CN) .......................... 2017 1 0867032

(51) Int. Cl.
*G02F 1/133* (2006.01)
*G02F 1/136* (2006.01)
(Continued)

(52) U.S. Cl.
CPC ...... *G02F 1/134363* (2013.01); *G02F 1/1368* (2013.01); *G02F 1/13306* (2013.01);
(Continued)

(58) Field of Classification Search
CPC .......... G02F 1/134363; G02F 1/13306; G02F 1/136213; G02F 1/136227; G02F 1/1368
See application file for complete search history.

(56) References Cited

U.S. PATENT DOCUMENTS

| | | | | | |
|---|---|---|---|---|---|
| 5,965,980 | A | * | 10/1999 | Hagiwara | H05B 33/26 313/318.06 |
| 6,194,808 | B1 | * | 2/2001 | Yamanouchi | G06G 7/195 310/313 D |

(Continued)

FOREIGN PATENT DOCUMENTS

| | | |
|---|---|---|
| CN | 101078841 A | 11/2007 |
| CN | 101490611 A | 7/2009 |

(Continued)

OTHER PUBLICATIONS

International Search Report and Written Opinion issued in corresponding International Application No. PCT/CN2018/105738, dated Dec. 19, 2018, with English translation.

(Continued)

*Primary Examiner* — Ida M Soward
(74) *Attorney, Agent, or Firm* — McDermott Will and Emery LLP

(57) ABSTRACT

A pixel structure includes a plate electrode, an interlayer insulating layer and strip electrodes which are sequentially arranged on a substrate. The strip electrodes include first (Continued)

strip electrode(s), second strip electrode(s) and third strip electrode(s). The first strip electrode(s) and the plate electrode are oppositely arranged, so that an orthographic projection of the first strip electrode(s) on the substrate at least partially overlaps with an orthographic projection of the plate electrode on the substrate. The first strip electrode(s) and the plate electrode are configured to be applied with different voltages during display.

18 Claims, 7 Drawing Sheets

(51) Int. Cl.
  *G02F 1/1343* (2006.01)
  *G02F 1/1362* (2006.01)
  *G02F 1/1368* (2006.01)
(52) U.S. Cl.
  CPC .. *G02F 1/136213* (2013.01); *G02F 1/136227* (2013.01); *G02F 2001/134318* (2013.01); *G02F 2201/123* (2013.01)

(56) References Cited

U.S. PATENT DOCUMENTS

| | | | |
|---|---|---|---|
| 7,944,529 B2* | 5/2011 | Ochiai | G02F 1/133555 349/114 |
| 8,339,557 B2* | 12/2012 | Ishida | G02F 1/1333 349/141 |
| 9,165,946 B1* | 10/2015 | Chang | G02F 1/133345 |
| 9,195,100 B2* | 11/2015 | Dong | G02F 1/134309 |
| 9,366,923 B2* | 6/2016 | Shen | H01L 27/124 |
| 9,379,148 B2* | 6/2016 | Sung | H01L 27/124 |
| 9,425,219 B2* | 8/2016 | Shi | H01L 27/124 |
| 9,436,044 B2* | 9/2016 | Qu | G02F 1/134309 |
| 9,470,939 B2* | 10/2016 | Liu | G02F 1/134363 |
| 9,696,582 B2* | 7/2017 | Choi | G02F 1/133553 |
| 10,001,681 B2* | 6/2018 | Kita | G09G 3/3607 |
| 10,054,830 B2* | 8/2018 | Kimura | G02F 1/136227 |
| 10,095,070 B2* | 10/2018 | Kimura | G02B 6/0051 |
| 10,317,737 B2* | 6/2019 | Hu | G02F 1/133345 |
| 10,437,094 B2* | 10/2019 | Yao | G02F 1/136209 |
| 2003/0076455 A1* | 4/2003 | Kwok | G02F 1/1391 349/99 |
| 2007/0268440 A1 | 11/2007 | Nagano | |
| 2007/0279567 A1* | 12/2007 | Matsushima | G02F 1/134363 349/143 |
| 2008/0204614 A1* | 8/2008 | Aota | G02F 1/136227 349/33 |
| 2009/0262286 A1 | 10/2009 | Nishida | |
| 2010/0245220 A1* | 9/2010 | Hsu | G02F 1/134363 345/87 |
| 2011/0249207 A1* | 10/2011 | Segawa | G02F 1/134363 349/33 |
| 2012/0235174 A1 | 9/2012 | Yu et al. | |
| 2013/0083280 A1* | 4/2013 | Liu | H01L 27/1288 349/141 |
| 2014/0049741 A1 | 2/2014 | Dong et al. | |
| 2014/0061646 A1 | 3/2014 | Liu | |
| 2014/0092352 A1* | 4/2014 | Kuriyama | G02F 1/134363 349/106 |
| 2015/0042911 A1 | 2/2015 | Konno et al. | |
| 2015/0212377 A1* | 7/2015 | Imaoku | G02F 1/1368 349/42 |
| 2016/0276377 A1* | 9/2016 | Sun | H01L 29/66765 |
| 2017/0235414 A1* | 8/2017 | Ding | G06F 3/0445 345/174 |
| 2017/0277004 A1 | 9/2017 | Cao et al. | |
| 2018/0143500 A1* | 5/2018 | Yu | G02F 1/136286 |
| 2019/0204956 A1* | 7/2019 | Iuchi | G06F 3/044 |
| 2019/0331969 A1* | 10/2019 | Atarashiya | G02F 1/13439 |

FOREIGN PATENT DOCUMENTS

| | | |
|---|---|---|
| CN | 102636921 A | 8/2012 |
| CN | 102830557 A | 12/2012 |
| CN | 102937767 A | 2/2013 |
| CN | 104375338 A | 2/2015 |
| CN | 104965370 A | 10/2015 |
| CN | 105068340 A | 11/2015 |
| CN | 105742295 A | 7/2016 |

OTHER PUBLICATIONS

First Office Action issued in corresponding Chinese Application No. 201710867032.5, dated Aug. 2, 2019, with English translation.

* cited by examiner

PIXEL STRUCTURE HAVING MULTIPLE STRIP ELECTRODES

CROSS-REFERENCE TO RELATED APPLICATION

This application is a national phase entry under 35 USC 371 of International Patent Application No. PCT/CN2018/105738 filed on Sep. 14, 2018, which claims priority to and benefits of Chinese Patent Application No. 201710867032.5, filed on Sep. 22, 2017, titled "PIXEL STRUCTURE, ARRAY SUBSTRATE AND DISPLAY DEVICE", which are incorporated herein by reference in their entirety.

TECHNICAL FIELD

The present disclosure relates to the field of display technologies, and more particularly, to a pixel structure, an array substrate and a display device.

BACKGROUND

Thin film transistor liquid crystal display (TFT-LCD) is a kind of important display device. Depending on directions of electric fields for driving the liquid crystals, TFT-LCDs can be classified into vertical electric field type TFT-LCDs and horizontal electric field type TFT-LCDs. As for vertical electric field type TFT-LCDs, it is necessary to form pixel electrodes in an array substrate, and to form common electrodes in a color filter substrate (CF substrate), such as in commonly used Twisted Nematic (TN) mode TFT-LCDs. As for horizontal electric field type TFT-LCDs, it is necessary to form both pixel electrodes and common electrodes in the array substrate, such as in Advanced Super Dimension Switch (ADS) mode TFT-LCDs.

SUMMARY

In an aspect, in embodiments of the present disclosure, a pixel structure is provided. The pixel structure includes a plate electrode, an interlayer insulating layer, and strip electrodes that are sequentially disposed on a substrate.

The strip electrodes include first strip electrode(s), second strip electrode(s) and third strip electrode(s).

The first strip electrode(s) and the plate electrode are oppositely disposed, so that an orthographic projection of the first strip electrode(s) on the substrate at least partially overlaps with an orthographic projection of the plate electrode on the substrate.

The first strip electrode(s) and the plate electrode are configured to be applied with different voltages during display.

In some embodiments of the present disclosure, the second strip electrode(s) and the third strip electrode(s) are alternately disposed and spaced apart.

The second strip electrode(s) and the third strip electrode(s) are configured to be applied with different voltages during display.

In some embodiments of the present disclosure, the first strip electrode(s) and the third strip electrode(s) are configured to be applied with a same voltage during display, and the plate electrode and the second strip electrode(s) are configured to be applied with a same voltage during display.

In some embodiments of the present disclosure, the orthographic projection of the first strip electrode(s) on the substrate is within a range of the orthographic projection of the plate electrode on the substrate.

In some embodiments of the present disclosure, the first strip electrode(s) are disposed in a middle region of the pixel structure, and the second strip electrode(s) and the third strip electrode(s) are all disposed in peripheral region(s) of the pixel structure.

In some embodiments of the present disclosure, the first strip electrode(s) are coupled to the third strip electrode(s).

In some embodiments of the present disclosure, the first strip electrode(s) and the second strip electrode(s) are spaced apart to be insulated from each other, and the third strip electrode(s) and the second strip electrode(s) are spaced apart to be insulated from each other.

In some embodiments of the present disclosure, the pixel structure forms a single sub-pixel, and a single sub-pixel corresponds to a display of a single color.

In some embodiments of the present disclosure, the second strip electrode(s) and the plate electrode are connected by a via hole penetrating the interlayer insulating layer.

In some embodiments of the present disclosure, the pixel circuit further includes a thin film transistor.

In some embodiments of the present disclosure, the interlayer insulating layer includes a gate insulating layer and a passivation layer that are disposed to be sequentially away from the substrate.

A gate of the thin film transistor is disposed on a surface of the substrate, and the gate of the thin film transistor and the plate electrode are disposed in a same layer.

The gate insulating layer is disposed on a surface of the gate away from the substrate.

An active layer of the thin film transistor is disposed on a surface of the gate insulating layer away from the gate.

A source and a drain of the thin film transistor are both disposed on a surface of the active layer away from the gate insulating layer.

The passivation layer is disposed on surfaces of the source and the drain away from the active layer.

The first strip electrode(s), the second strip electrode(s) and the third strip electrode(s) are all disposed on a surface of the passivation layer away from the source and the drain. The second strip electrode(s) are coupled to the plate electrode via a via hole penetrating the gate insulating layer and the passivation layer, and the second strip electrode(s) are further coupled to the drain of the thin film transistor via a via hole penetrating the passivation layer.

In some embodiments of the present disclosure, the second strip electrode(s) and the plate electrode together form a pixel electrode, and the first strip electrode(s) and the third strip electrode(s) are coupled to together form a common electrode.

In some embodiments of the present disclosure, the interlayer insulating layer includes a gate insulating layer and a passivation layer that are disposed to be sequentially away from the substrate.

A gate of the thin film transistor is disposed on a surface of the substrate, and the gate of the thin film transistor and the plate electrode are disposed in a same layer.

The gate insulating layer is disposed on a surface of the gate away from the substrate.

An active layer of the thin film transistor is disposed on a surface of the gate insulating layer away from the gate.

A source and a drain of the thin film transistor are both disposed on a surface of the active layer away from the gate insulating layer.

The passivation layer is disposed on surfaces of the source and the drain away from the active layer.

The first strip electrode(s), the second strip electrode(s) and the third strip electrode(s) are all disposed on a surface of the passivation layer away from the source and the drain. The second strip electrode(s) are coupled to the plate electrode via a via hole penetrating the gate insulating layer and the passivation layer, and the third strip electrode(s) are coupled to the drain of the thin film transistor via a via hole penetrating the passivation layer.

In some embodiments of the present disclosure, the first strip electrode(s) and the third strip electrode(s) are coupled to together form a pixel electrode, and the second strip electrode(s) and the plate electrode together form a common electrode.

In some embodiments of the present disclosure, the interlayer insulating layer includes a passivation layer.

A gate of the thin film transistor is disposed on a surface of the substrate.

The pixel structure further includes a gate insulating layer disposed on a surface of the gate away from the substrate.

An active layer of the thin film transistor is disposed on a surface of the gate insulating layer away from the gate, and the active layer of the thin film transistor and the plate electrode are disposed in a same layer.

A source and a drain of the thin film transistor are both disposed on a surface of the active layer away from the gate insulating layer, and the drain of the thin film transistor is directly coupled to the plate electrode.

The passivation layer is disposed on surfaces of the source and the drain of the thin film transistor away from the active layer.

The first strip electrode(s), the second strip electrode(s) and the third strip electrode(s) are all disposed on a surface of the passivation layer away from the source and the drain, and the second strip electrode(s) are coupled to the plate electrode via a via hole penetrating the gate insulating layer.

In some embodiments of the present disclosure, the first strip electrode(s) and the third strip electrode(s) are coupled to together form a common electrode, and the second strip electrode(s) and the plate electrode together form a pixel electrode.

In another aspect, in some embodiments of the present disclosure, an array substrate is provided. The array substrate includes pixel structures, each of which is any pixel structure described above.

In yet another aspect, in some embodiments of the present disclosure, a display device is provided. The display device includes the array substrate.

DETAILED DESCRIPTION

In order to make those skilled in the art better understand the technical solutions of the present disclosure, the present disclosure will be further described in detail below in conjunction with the accompanying drawings and specific embodiments.

Figure 1:
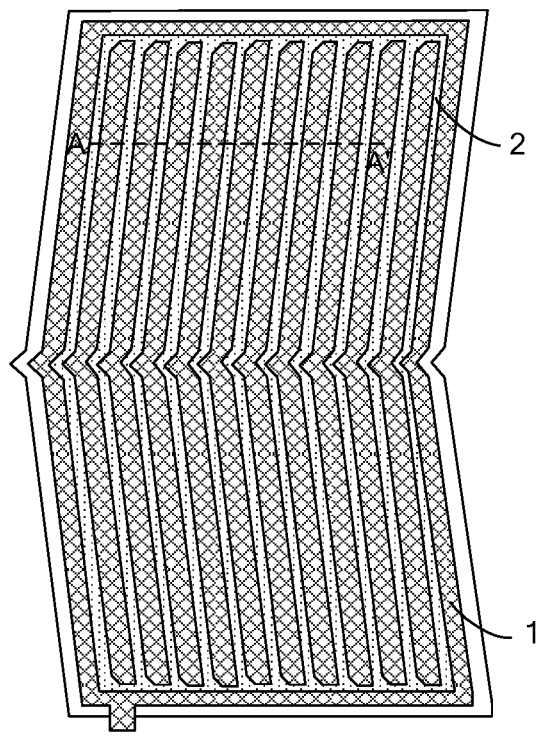
FIG. 1 is a top view of a pixel structure in an array substrate, in accordance with exemplary embodiments of the present disclosure.
Figure 2:
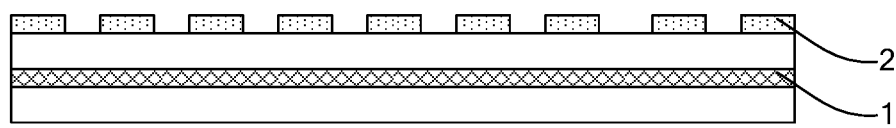
FIG. 2 is a sectional view taken along line A-A' in FIG. 1.

Referring to FIGS. 1 and 2, ADS (short for Advanced Super Dimension Switch) is a core in-plane electric field wide viewing angle technology. A core feature of ADS technology can be described as: electric fields generated at fringes of strip electrodes 2 in a same plane and electric fields generated between a layer where the strip electrodes 2 are located and a layer where a plate electrode 1 is located together form multi-dimensional electric fields, so that liquid crystal molecules in all directions located between the strip electrodes 2 and located directly above the strip electrodes 2 in a liquid crystal cell may be rotated, thereby improving working efficiency of liquid crystals and increasing a light transmission efficiency.

At present, large-size and high-resolution thin film transistor liquid crystal display (TFT-LCD) products, especially display products each having a Gate Driver on Array (GOA) structure are an important development direction of television (TV) products.

For example, since a charging time of an UHD (short for Ultra High Definition, which means a resolution is for example 3840*2160) GOA product is short (at 60 Hz, 1 H charging time of an UD Normal product is only about 7.4 µs, and 1 H charging time of an UHD Dual Gate product is even halved), and driving capability of GOA is limited, insufficient charging is a big problem.

Herein, an UD (short for UHD) Normal product refers to a conventional high-definition product, that is, a display in which one row of pixels is controlled by a single gate line. An UHD Dual Gate product refers to an ultra-high-definition product with dual gates (gate lines), that is, a display in which one row of pixels is controlled by two gate lines. By "1 H charging time is only about 7.4 μs", it means that a time during which the gate line of each row (i.e., "1 H", "H" is the first letter in the Chinese pinyin of "行", which means "row") is turned on (i.e., charging time) is 7.4 μs.

In order to meet requirements for a charging rate, the requirements are generally met by increasing a W/L value of the thin film transistor (TFT) (using SSM/MSM technology) and by increasing a line width of wiring to reduce resistance. However, if a size of the TFT and the line width are increased, an aperture ratio of a pixel, which is already very small, will be further reduced. Consequently, a transmittance of the display panel will be affected, and power consumption of a backlight will be increased.

Herein, a distance between a source and a drain of the TFT is referred to as a length (L) of a channel, and a width (W) of the source and the drain is perpendicular to a direction of L. Therefore, the W/L value refers to a width-to-length ratio of the channel.

SSM is a manufacturing technology of TFT and is short for Single Slit Mask. Namely, the TFT is manufactured by using a single-slit mask. MSM is another manufacturing technology of TFT and is short for Modified Single Slit Mask. Namely, the TFT is manufactured by using a modified single-slit mask.

In ADS mode, lateral capacitances and an overlap capacitance existing between two layers of electrodes (the strip electrodes 2 and the plate electrode 1) in the array substrate constitute a storage capacitance. In ADS display mode, the larger storage capacitance (Csc) is an important factor affecting the charging rate.

As shown in FIGS. 3 to 13, some embodiments of the present disclosure provide a pixel structure, which includes a plate electrode 1, an interlayer insulating layer 5, and strip electrodes that are sequentially disposed on a substrate 10. The strip electrodes 20 include first strip electrode(s) 21, second strip electrode(s) 22, and third strip electrode(s) 23. The first strip electrode(s) 21 and the plate electrode 1 are oppositely disposed, so that an orthographic projection of the first strip electrode(s) 21 on the substrate 10 at least partially overlaps with an orthographic projection of the plate electrode 1 on the substrate 10. The first strip electrode(s) 21 and the plate electrode 1 are configured to be applied with different voltages during display.

It will be noted that specific numbers of the first strip electrode(s) 21, the second strip electrode(s) 22, and the third strip electrode(s) 23 are not limited. That is, there is at least one first strip electrode 21, at least one second strip electrode 22, and at least one third strip electrode 23.

Since the first strip electrode(s) 21 and the plate electrode 1 are oppositely disposed, the orthographic projection of the first strip electrode(s) 21 on the substrate 10 at least partially overlaps with the orthographic projection of the plate electrode 1 on the substrate 10, and a storage capacitance exists between portions, the orthographic projections of which overlap with each other, of the first strip electrode(s) 21 and the plate electrode 1.

In the pixel structure provided in some embodiments of the present disclosure, the first strip electrode(s) 21, the second strip electrode(s) 22, and the third strip electrode(s) 23 are disposed in a same layer, and the plate electrode 1 is disposed only opposite to the first strip electrode(s) 21 of the strip electrodes 20. Therefore, an overlap capacitance exists only between the first strip electrode(s) 21 and the plate electrode 1, which greatly reduces an area of the overlap capacitor between the strip electrodes 20 and the plate electrode 1 as compared to a conventional pixel structure. That is, the storage capacitance existing between the strip electrodes 20 and the plate electrode 1 is reduced, thereby increasing the charging rate of the pixel structure.

In this way, in the above embodiments provided by the present disclosure, requirements for the charging rate may be met by reducing the capacitance of the storage capacitor without needing to, for example, increase the size of the TFT and/or increase the line width. Therefore, the aperture ratio of a pixel, which is already very small, will not be affected, thereby avoiding reduction of the aperture ratio of the pixel.

In some embodiments of the present disclosure, the orthographic projection of the first strip electrode(s) 21 on the substrate 10 is within a range of the orthographic projection of the plate electrode 1 on the substrate 10.

In some embodiments of the present disclosure, the second strip electrode(s) 22 and the third strip electrode(s) 23 are alternately disposed and spaced apart. The second strip electrode(s) 22 and the third strip electrode(s) 23 are configured to be applied with different voltages during display. In this way, horizontal electric fields may be formed between the second strip electrode(s) 22 and the third strip electrode(s) 23. In a case where the pixel structure is applied to a liquid crystal display device, the horizontal electric fields may be used to strengthen control over deflection of the liquid crystal molecules.

For example, during display, the first strip electrode(s) 21 and the third strip electrode(s) 23 are configured to be applied with a same voltage, and the plate electrode 1 and the second strip electrode(s) 22 are configured to be applied with a same voltage.

Figure 3:
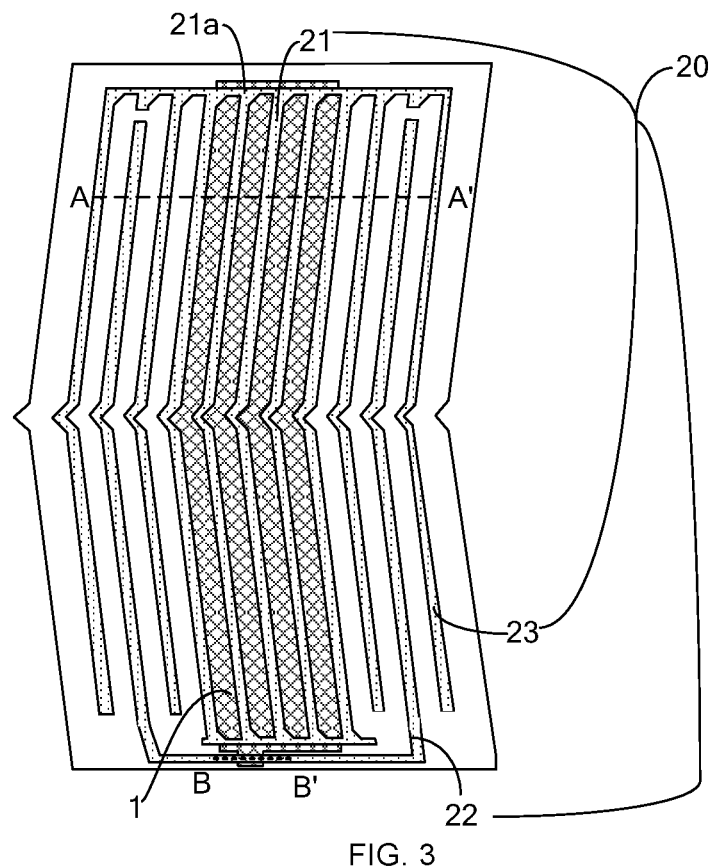
FIG. 3 is a top view of a pixel structure, in accordance with some embodiments of the present disclosure.
Figure 4:
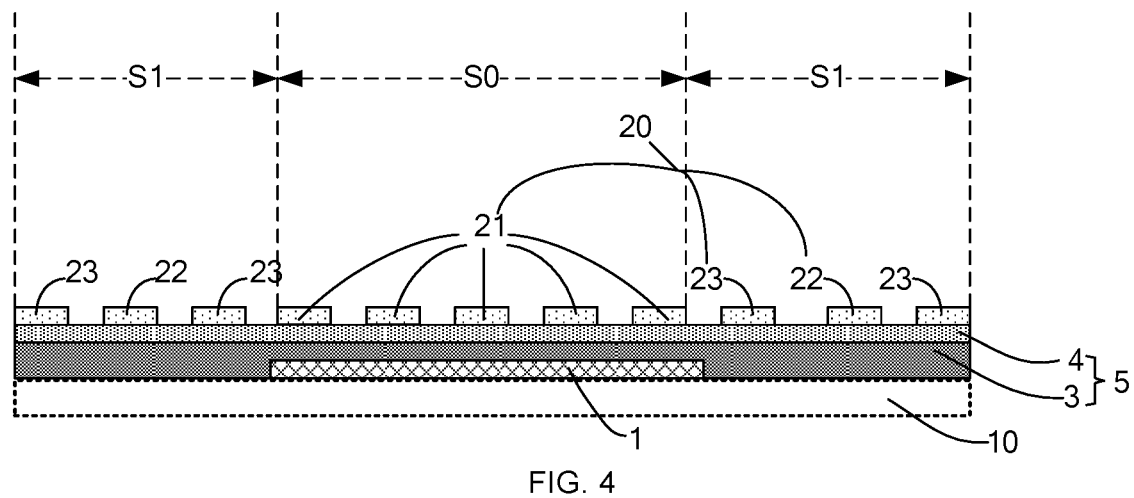
FIG. 4 is a sectional view taken along line A-A' in FIG. 3 in a case where the pixel structure shown in FIG. 3 is of ADS display mode (the pixel structure is configured to be suitable to be disposed on a substrate indicated by a broken line)

As shown in FIGS. 3 and 4, for example, first strip electrodes 21 are disposed in a middle region of the pixel structure. Since the plate electrode 1 is disposed opposite to the first strip electrodes 21 of the strip electrodes 20, the plate electrode 1 is also disposed in the middle region of the pixel structure. Second strip electrodes 22 and third strip electrodes 23 are all disposed in peripheral regions of the pixel structure.

For ease of clarity, the middle region and the peripheral regions are only shown in FIG. 4 and are labeled S0 and S1, respectively.

With this arrangement, it is easy to connect the first strip electrode(s) 21 to the third strip electrode(s) 23, so that the first strip electrode(s) 21 and the third strip electrode(s) 23 have a same potential during display. In addition, the second strip electrode(s) 22 are connected to the plate electrode 1 via a via hole penetrating the interlayer insulating layer, so that the second strip electrode(s) 22 and the plate electrode 1 have a same potential during display.

In some embodiments of the present disclosure, the first strip electrode(s) 21 and the second strip electrode(s) 22 are spaced apart to be insulated from each other, and the third strip electrode(s) 23 and the second strip electrode(s) 22 are spaced apart to be insulated from each other.

The first strip electrode(s) 21, the second strip electrode(s) 22, and the third strip electrode(s) 23 are disposed in a same layer, that is, all disposed on a same surface of the interlayer insulating layer 5.

As shown in FIG. 3, a manner in which the first strip electrodes 21 are connected to the third strip electrodes 23 may be, for example, that the first strip electrodes 21 and the third strip electrodes 23 are connected together by a lateral electrode 21*a* disposed at an angle to an extending direction of a portion of each first strip electrode 21 adjacent to the lateral electrode 21*a*.

The second strip electrode(s) 22 and the third strip electrode(s) 23 may also be disposed on a same side of the pixel structure, and the first strip electrode(s) 21 may be disposed on another side of the pixel structure that is opposite to the side on which the second strip electrode(s) 22 and the third strip electrode(s) 23 are disposed.

In this way, an additional control signal for controlling the second strip electrode(s) 22 will not be needed, and similarly, an additional control signal for controlling the third strip electrode(s) 23 will not be needed, thereby reducing manufacturing cost.

In some embodiments of the present disclosure, a single pixel structure as described above forms a single sub-pixel, and a single sub-pixel corresponds to a display of a single color.

The pixel structure provided in some embodiments of the present disclosure may be of ADS display mode, or may be of HADS (i.e., high-transmittance ADS) display mode. A pixel structure of ADS display mode and a pixel structure of HADS display mode are respectively described below.

Figure 5:
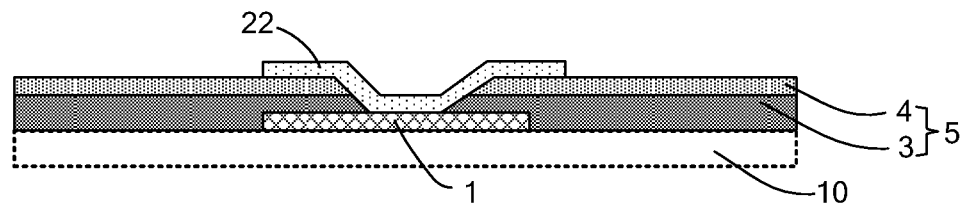
FIG. 5 is a sectional view taken along line B-B' in FIG. 3 in a case where the pixel structure shown in FIG. 3 is of ADS display mode (the pixel structure is configured to be suitable to be disposed on a substrate indicated by a broken line)

For example, as shown in FIGS. 4 and 5, a pixel structure of ADS display mode provided in some embodiments of the present disclosure includes strip electrodes 20, a plate electrode 1 and a thin film transistor 6 (due to limitation of the sectional direction, the thin film transistor 6 is not shown in FIGS. 4 and 5).

Figure 6:
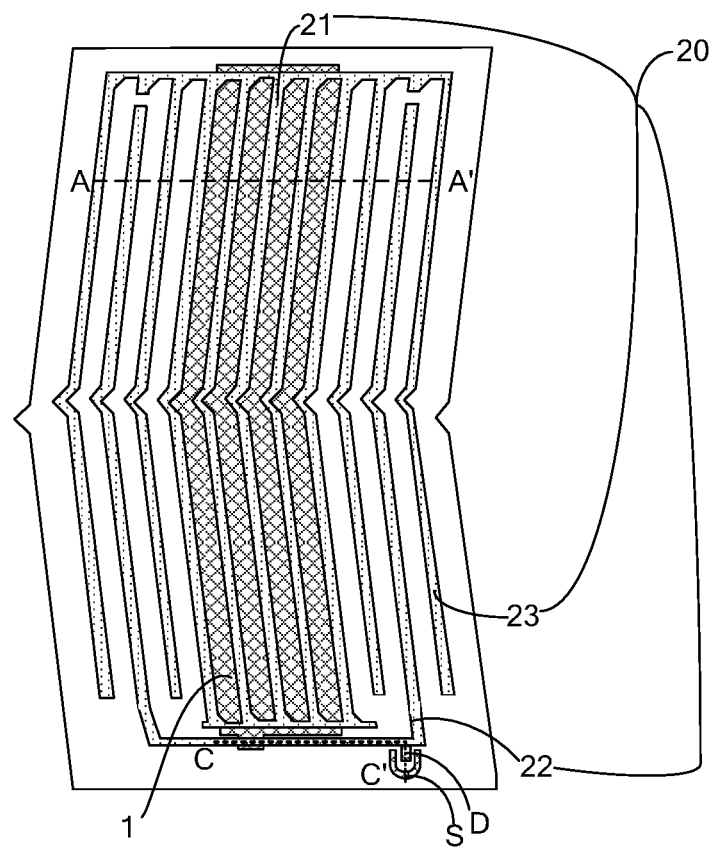
FIG. 6 is a top view of another pixel structure, in accordance with some embodiments of the present disclosure.
Figure 7:
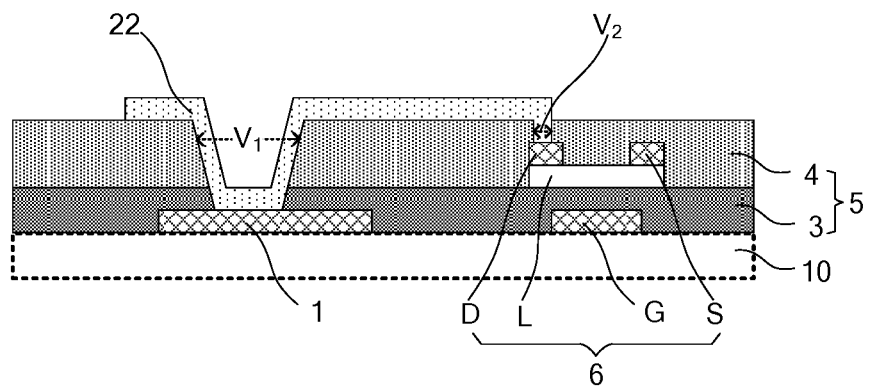
FIG. 7 is a sectional view of the pixel structure taken along line C-C' shown in FIG. 6 (the pixel structure is configured to be suitable to be disposed on a substrate indicated by a broken line)

The interlayer insulating layer 5 located between the plate electrode 1 and the strip electrodes 20 includes a gate insulating layer 3 and a passivation layer 4 that are disposed to be sequentially away from the substrate 10. As shown in FIGS. 6 and 7, a gate G of the thin film transistor 6 is disposed on a surface of the substrate 10, and the gate G of the thin film transistor 6 and the plate electrode 1 are disposed in a same layer. The gate insulating layer 3 is disposed on a surface of a layer where the gate G is located that is away from the substrate 10. An active layer L of the thin film transistor 6 is disposed on a surface of the gate insulating layer 3 away from the gate G. A source S and a drain D of the thin film transistor 6 are both disposed on a surface of the active layer L away from the gate insulating layer 3. The passivation layer 4 is disposed on surfaces of the source S and the drain D away from the active layer L. The first strip electrodes 21, the second strip electrodes 22, and the third strip electrodes 23 are all disposed on the passivation layer 4 (herein, reference is made to FIG. 4 for the first strip electrodes 21 and the third strip electrodes 23). The second strip electrodes 22 are connected to the plate electrode 1 via a via hole $V_1$ penetrating the gate insulating layer 3 and the passivation layer 4, and the second strip electrodes 22 are further connected to the drain D of the thin film transistor 6 via a via hole $V_2$ penetrating the passivation layer 4.

In this case, the first strip electrodes 21 and the third strip electrodes 23 serve as a common electrode; and the second strip electrodes 22 and the plate electrode 1 serve as a pixel electrode. That is, the first strip electrodes 22 and the plate electrode 1 together form a pixel electrode; and the first strip electrodes 21 and the third strip electrodes 23 together form a common electrode.

For example, the second strip electrodes 22 are not connected to the drain of the thin film transistor, the first strip electrodes 21 are connected to the third strip electrodes 23, and the third strip electrodes 23 are connected to the drain of the thin film transistor via a via hole penetrating the passivation layer. In this case, the first strip electrodes 21 and the third strip electrodes 23 serve as the pixel electrode, and the second strip electrodes 22 and the plate electrode 1 serve as the common electrode.

Figure 8:
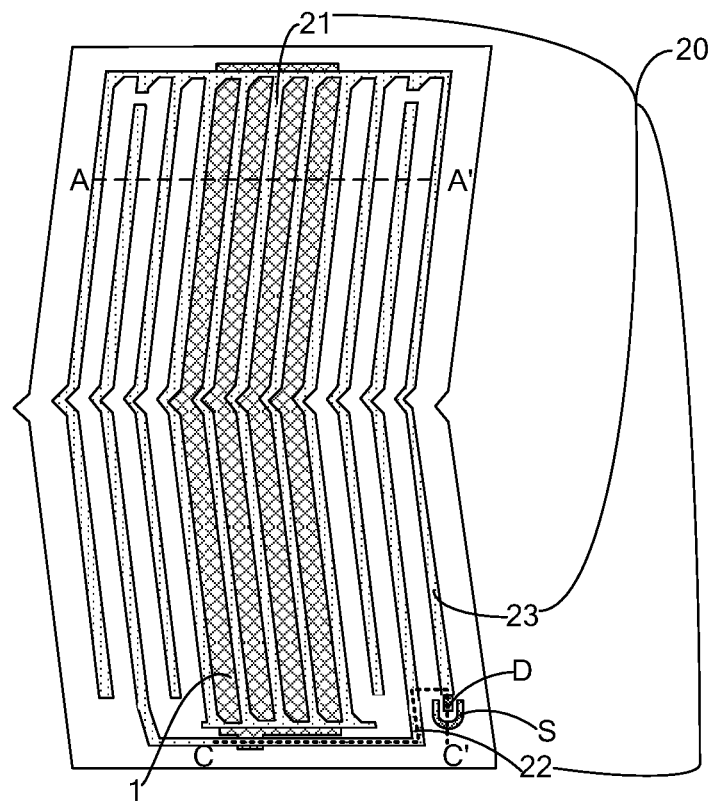
FIG. 8 is a top view of yet another pixel structure, in accordance with some embodiments of the present disclosure.
Figure 9:
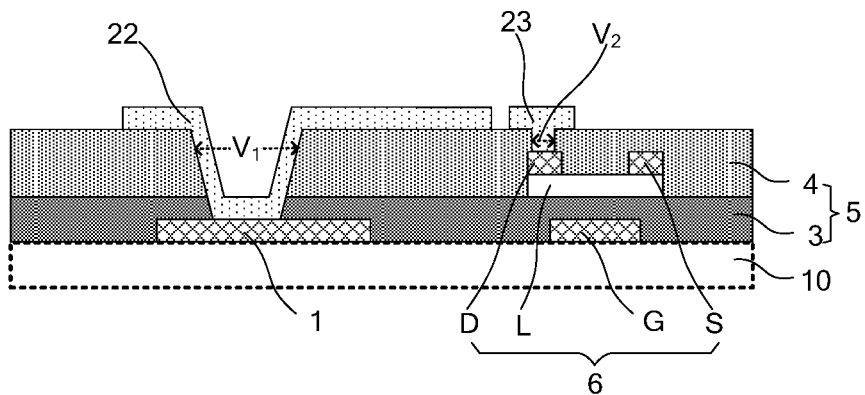
FIG. 9 is a sectional view of the pixel structure taken along line C-C' shown in FIG. 8 (the pixel structure is configured to be suitable to be disposed on a substrate indicated by a broken line)

The pixel structure with the above structure, as another pixel structure of ADS display mode provided in some embodiments of the present disclosure, is, for example, as follows. The pixel structure further includes a thin film transistor 6, and the interlayer insulating layer 5 includes a gate insulating layer 3 and a passivation layer 4 that are disposed to be sequentially away from the substrate 10. As shown in FIGS. 8 and 9, a gate G of the thin film transistor 6 is disposed on a surface of the substrate 10, and the gate G of the thin film transistor 6 and the plate electrode 1 are disposed in a same layer. The gate insulating layer 3 is disposed on a surface of the gate G away from the substrate 10. An active layer L of the thin film transistor 6 is disposed on a surface of the gate insulating layer 3 away from the gate G. A source S and a drain D of the thin film transistor 6 are both disposed on a surface of the active layer L away from the gate insulating layer 3. The passivation layer 4 is disposed on surfaces of the source S and the drain D away from the active layer L. The first strip electrodes 21, the second strip electrodes 22, and the third strip electrodes 23 are all disposed on a surface of the passivation layer 4 away from the source S and the drain D. The second strip electrodes 22 are connected to the plate electrode 1 via a via hole $V_1$ penetrating the gate insulating layer 3 and the passivation layer 4, and the third strip electrodes 23 are connected to the drain D of the thin film transistor 6 via a via hole $V_2$ penetrating the passivation layer 4.

That is, the first strip electrodes 21 and the third strip electrodes 23 are connected to together form the pixel electrode; and the second strip electrodes 22 and the plate electrode 1 together form the common electrode.

Figure 10:
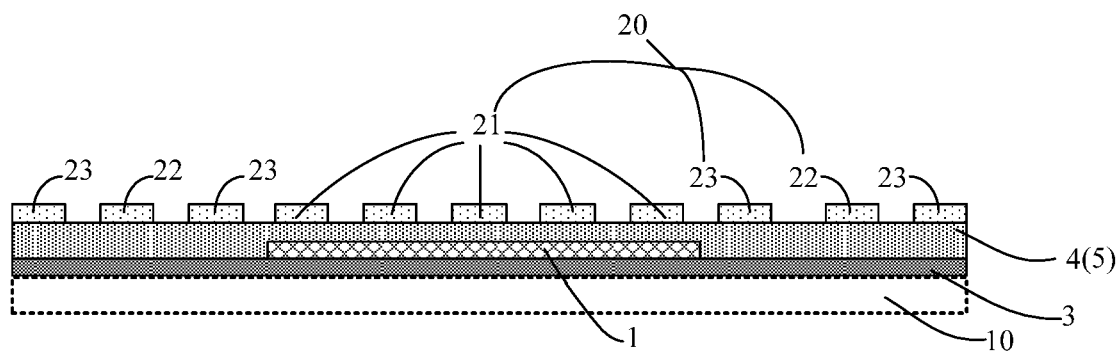
FIG. 10 is a sectional view taken along line A-A' in FIG. 3 in a case where the pixel structure shown in FIG. 3 is of HADS display mode (the pixel structure is configured to be suitable to be disposed on a substrate indicated by a broken line)
Figure 11:
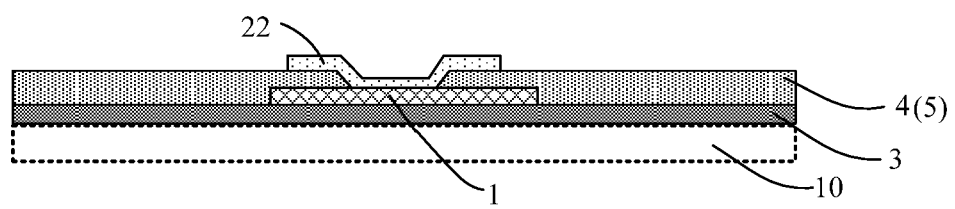
FIG. 11 is a sectional view taken along line B-B' in FIG. 3 in a case where the pixel structure shown in FIG. 3 is of HADS display mode (the pixel structure is configured to be suitable to be disposed on a substrate indicated by a broken line)

In some examples, as shown in FIGS. 10 and 11, a pixel structure of HADS display mode provided in the above embodiment includes strip electrodes 20, a plate electrode 1, and a thin film transistor 6 (due to limitation of the sectional direction, the thin film transistor 6 is not shown in FIGS. 10 and 11).

Figure 12:
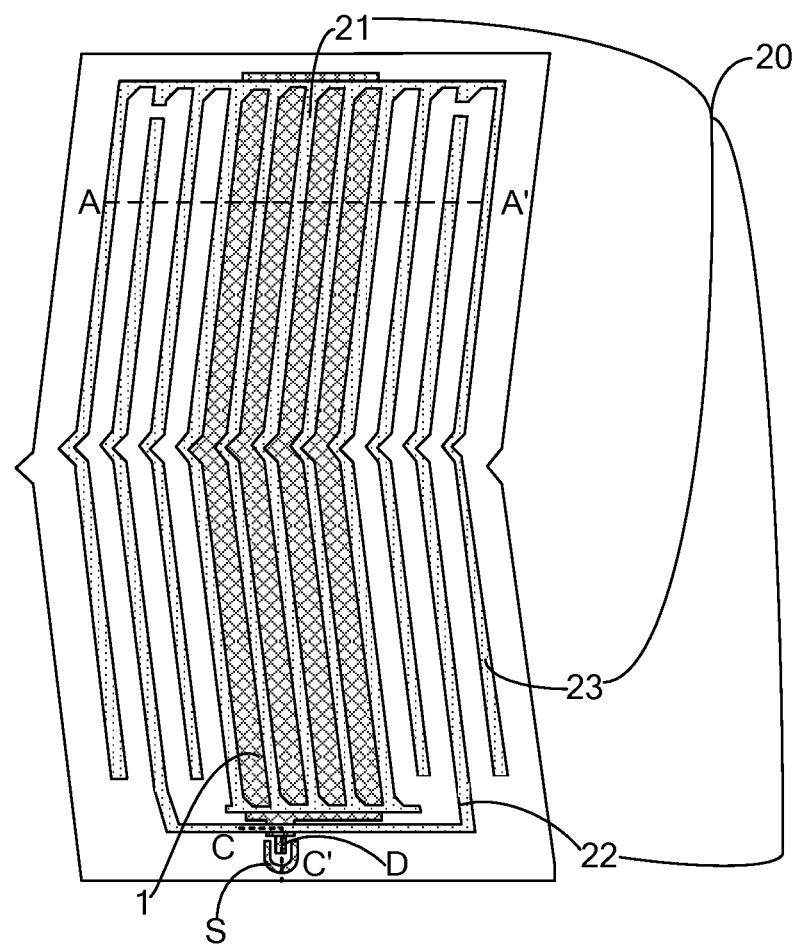
FIG. 12 is a top view of yet another pixel structure, in accordance with some embodiments of the present disclosure.
Figure 13:
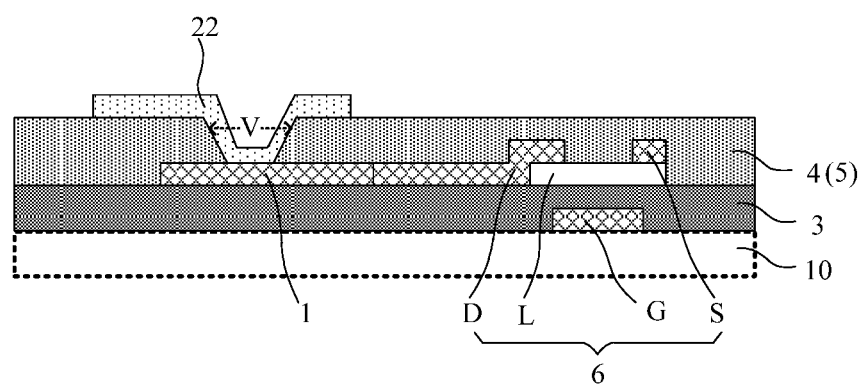
FIG. 13 is a sectional view of the pixel structure taken along line C-C' shown in FIG. 12 (the pixel structure is configured to be suitable to be disposed on a substrate indicated by a broken line)

The interlayer insulating layer 5 located between the plate electrode 1 and the strip electrodes 20 includes a passivation layer 4. As shown in FIGS. 12 and 13, a gate G of the thin film transistor 6 is disposed on a surface of the substrate 10. A gate insulating layer 3 is disposed on the gate G. An active layer L of the thin film transistor 6 is disposed on a surface of the gate insulating layer 3 away from the gate G, and the active layer L of the thin film transistor 6 and the plate electrode 1 are disposed in a same layer. A source S and a drain D of the thin film transistor 6 are both disposed on a surface of the active layer L away from the gate insulating layer 3, and the drain D of the thin film transistor 6 is directly connected to the plate electrode 1. The passivation layer 4 is disposed on the source S and the drain D of the thin film transistor 6. The first strip electrodes 21, the second strip electrodes 22, and the third strip electrodes 23 are all disposed on a surface of the passivation layer 4 away from the source S and the drain D (herein, reference is made to FIG. 10 for the first strip electrodes 21 and the third strip electrodes 23), and the second strip electrodes 22 are connected to the plate electrode 1 via a via hole V penetrating the passivation layer 4. The first strip electrodes 22 are connected to the third strip electrodes 23 (referring to FIG. 12).

In this case, the first strip electrodes and the third strip electrodes serve as the common electrode; and the second strip electrodes and the plate electrode serve as the pixel electrode.

In the pixel structure provided in some embodiments of the present disclosure, materials of the first strip electrode(s) 21, the second strip electrode(s) 22, and the third strip electrode(s) 23 all include a transparent conductive material or a metal material. The material may, for example, be indium tin oxide (ITO) or MoTi (molybdenum and titanium) alloy.

A material of the plate electrode 1 is a transparent conductive material, and the transparent conductive material may be ITO. Of course, the transparent conductive material may also be other transparent conductive materials.

Figure 14:
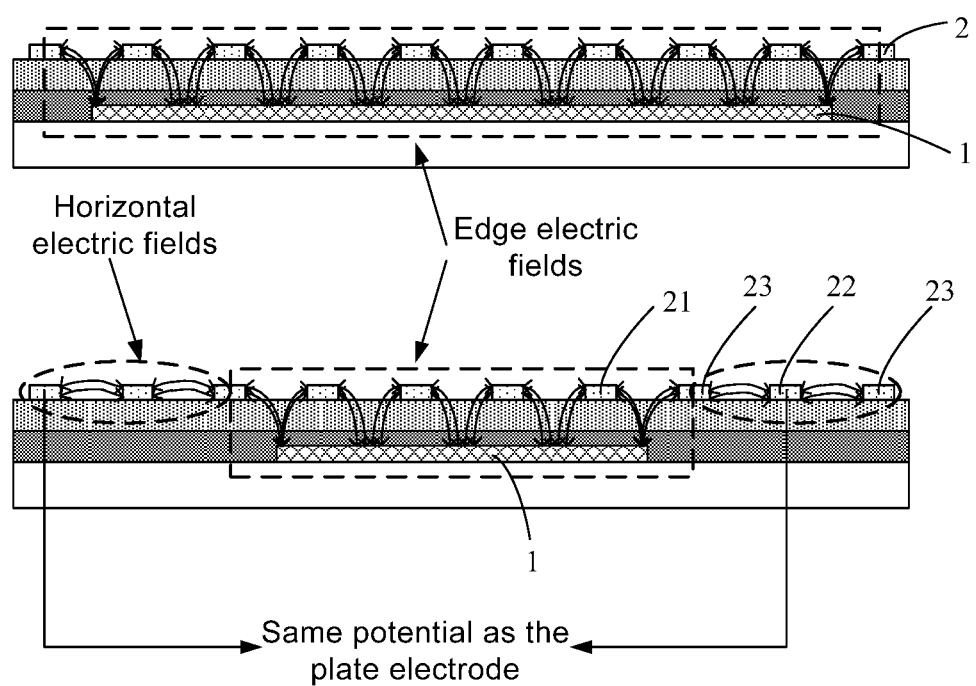
FIG. 14 is a schematic diagram showing a comparison of electric fields formed by a pixel structure in accordance with some embodiments of the present disclosure with electric fields formed by a conventional pixel structure.

FIG. 14 is a schematic diagram showing a comparison of electric fields formed by the pixel structure in accordance with some embodiments of the present disclosure with electric fields formed by a conventional pixel structure. As can be seen from FIG. 14, in the conventional pixel structure, since the orthographic projection of the strip electrodes 2 on the substrate 10 and the orthographic projection of the plate electrode 1 on the substrate 10 are almost completely overlapped, a storage capacitance existing between the strip electrodes 2 and the plate electrode 1 is relatively large. Moreover, only edge electric fields are formed between the strip electrodes 2 and the plate electrode 1, leading to a large operation voltage (Vop) and thus high power consumption in logic circuits of a product.

However, in the pixel structure provided in some embodiments of the present disclosure described above, the plate electrode 1 below is retracted, such that the plate electrode 1 is disposed to be only opposite to the first strip electrodes 21 in the strip electrodes. As a result, an overlap area between the plate electrode 1 and the strip electrodes 20 is reduced, and thus a storage capacitance existing between the plate electrode 1 and the strip electrodes 20 is reduced.

In addition, the first strip electrodes 21 and the plate electrode 1 are disposed in a middle region of the pixel structure, and the first strip electrodes 21 and the plate electrode 1 are configured to have different potentials during display. The second strip electrodes 22 and the third strip electrodes 23 disposed in a same layer as the first strip electrodes 21 are all disposed in peripheral regions of the pixel structure (i.e., a left side and a right side in FIG. 14), and the second strip electrodes 22 and the third strip electrodes 23 are also configured to have different potentials during display.

In this way, the edge electric fields formed between the plate electrode 1 and the first strip electrodes 21 that are oppositely disposed may be used to control the liquid crystal molecules to deflect, and horizontal electric fields formed between the second strip electrodes 22 and the third strip electrodes that are disposed in the same layer on the left side and the right side may be used to control the liquid crystal molecules to deflect. Vop of the horizontal electric fields on the left side and the right side are lower than Vop of the edge electric fields in the middle, thereby reducing the power consumption in the logic circuits of the product.

Correspondingly, some embodiments of the present disclosure provide an array substrate and a display device. The array substrate includes pixel structures described above. The display device includes the array substrate.

The display device may be a mobile phone, a tablet computer, a television, a display, a notebook computer, a digital photo frame, a navigator, or any other product or component having a display function.

Of course, the display device provided in this embodiment may further include other conventional structures, such as a power supply unit, a display driving unit, etc.

It will be understood that, the above embodiments are merely exemplary embodiments employed to explain the principles of the present disclosure, but the present disclosure is not limited thereto. Various modifications and improvements can be made by a person skilled in the art without departing from the spirit and scope of the present disclosure, and such modifications and improvements are also within the scope of the present disclosure.

The foregoing descriptions are merely some specific implementation manners of the present disclosure, but the protection scope of the present disclosure is not limited thereto. Any person skilled in the art could readily conceive of changes or replacements within the technical scope of the present disclosure, which shall all be included in the protection scope of the present disclosure. Therefore, the protection scope of the present disclosure shall be subject to the protection scope of the claims.

What is claimed is:

1. A pixel structure, comprising: a plate electrode, an interlayer insulating layer, and strip electrodes that are sequentially disposed on a substrate, wherein
    the strip electrodes include first strip electrode(s), second strip electrode(s) and third strip electrode(s);
    the first strip electrode(s) and the plate electrode are oppositely disposed, so that an orthographic projection of the first strip electrode(s) on the substrate at least partially overlaps with an orthographic projection of the plate electrode on the substrate; and
    the first strip electrode(s) and the plate electrode are configured to be applied with different voltages during display.

2. The pixel structure according to claim 1, wherein the second strip electrode(s) and the third strip electrode(s) are alternately disposed and spaced apart; and
    the second strip electrode(s) and the third strip electrode(s) are configured to be applied with different voltages during display.

3. The pixel structure according to claim 2, wherein the first strip electrode(s) and the third strip electrode(s) are configured to be applied with a same voltage during display, and the plate electrode and the second strip electrode(s) are configured to be applied with a same voltage during display.

4. The pixel structure according to claim 2, wherein the orthographic projection of the first strip electrode(s) on the substrate is within a range of the orthographic projection of the plate electrode on the substrate.

5. The pixel structure according to claim 1, wherein the first strip electrode(s) are disposed in a middle region of the pixel structure, and the second strip electrode(s) and the third strip electrode(s) are all disposed in peripheral region(s) of the pixel structure.

6. The pixel structure according to claim 1, wherein the first strip electrode(s) are coupled to the third strip electrode(s).

7. The pixel structure according to claim 1, wherein the first strip electrode(s) and the second strip electrode(s) are spaced apart to be insulated from each other, and the third strip electrode(s) and the second strip electrode(s) are spaced apart to be insulated from each other.

8. The pixel structure according to claim 1, wherein the pixel structure forms a single sub-pixel, and a single sub-pixel corresponds to a display of a single color.

9. The pixel structure according to claim 1, wherein the second strip electrode(s) and the plate electrode are coupled via a via hole penetrating the interlayer insulating layer.

10. The pixel structure according to claim 1, wherein the pixel structure further comprises a thin film transistor.

11. The pixel structure according to claim 10, wherein the interlayer insulating layer includes a gate insulating layer and a passivation layer that are disposed to be sequentially away from the substrate, wherein
- a gate of the thin film transistor is disposed on a surface of the substrate, and the gate of the thin film transistor and the plate electrode are disposed in a same layer;
- the gate insulating layer is disposed on a surface of the gate away from the substrate;
- an active layer of the thin film transistor is disposed on a surface of the gate insulating layer away from the gate;
- a source and a drain of the thin film transistor are both disposed on a surface of the active layer away from the gate insulating layer;
- the passivation layer is disposed on surfaces of the source and the drain away from the active layer;
- the first strip electrode(s), the second strip electrode(s) and the third strip electrode(s) are all disposed on a surface of the passivation layer away from the source and the drain; the second strip electrode(s) are coupled to the plate electrode via a via hole penetrating the gate insulating layer and the passivation layer, and the second strip electrode(s) are further coupled to the drain of the thin film transistor via a via hole penetrating the passivation layer.

12. The pixel structure according to claim 11, wherein
- the second strip electrode(s) and the plate electrode together form a pixel electrode;
- the first strip electrode(s) and the third strip electrode(s) are coupled to together fo in a common electrode.

13. The pixel structure according to claim 10, wherein the interlayer insulating layer includes a gate insulating layer and a passivation layer that are disposed to be sequentially away from the substrate, wherein
- a gate of the thin film transistor is disposed on a surface of the substrate, and the gate of the thin film transistor and the plate electrode are disposed in a same layer;
- the gate insulating layer is disposed on a surface of the gate away from the substrate;
- an active layer of the thin film transistor is disposed on a surface of the gate insulating layer away from the gate;
- a source and a drain of the thin film transistor are both disposed on a surface of the active layer away from the gate insulating layer;
- the passivation layer is disposed on surfaces of the source and the drain away from the active layer;
- the first strip electrode(s), the second strip electrode(s) and the third strip electrode(s) are all disposed on a surface of the passivation layer away from the source and the drain; the second strip electrode(s) are coupled to the plate electrode via a via hole penetrating the gate insulating layer and the passivation layer; and the third strip electrode(s) are coupled to the drain of the thin film transistor via a via hole penetrating the passivation layer.

14. The pixel structure according to claim 13, wherein
- the first strip electrode(s) and the third strip electrode(s) are coupled to together form a pixel electrode; and
- the second strip electrode(s) and the plate electrode together form a common electrode.

15. The pixel structure according to claim 10, wherein the interlayer insulating layer includes a passivation layer, wherein
- a gate of the thin film transistor is disposed on a surface of the substrate;
- the pixel structure further comprises a gate insulating layer disposed on a surface of the gate away from the substrate;
- an active layer of the thin film transistor is disposed on a surface of the gate insulating layer away from the gate, and the active layer of the thin film transistor and the plate electrode are disposed in a same layer;
- a source and a drain of the thin film transistor are both disposed on a surface of the active layer away from the gate insulating layer, and the drain of the thin film transistor is directly coupled to the plate electrode;
- the passivation layer is disposed on surfaces of the source and the drain of the thin film transistor away from the active layer;
- the first strip electrode(s), the second strip electrode(s) and the third strip electrode(s) are all disposed on a surface of the passivation layer away from the source and the drain, and the second strip electrode(s) are coupled to the plate electrode via a via hole penetrating the passivation layer.

16. The pixel structure according to claim 15, wherein
- the first strip electrode(s) and the third strip electrode(s) are coupled to together form a common electrode; and
- the second strip electrode(s) and the plate electrode together form a pixel electrode.

17. An array substrate, comprising pixel structures according to claim 1.

18. A display device, comprising the array substrate according to claim 17.

* * * * *

UNITED STATES PATENT AND TRADEMARK OFFICE
CERTIFICATE OF CORRECTION

PATENT NO. : 10,921,655 B2
APPLICATION NO. : 16/473970
DATED : February 16, 2021
INVENTOR(S) : Xiaoyuan Wang et al.

Page 1 of 1

It is certified that error appears in the above-identified patent and that said Letters Patent is hereby corrected as shown below:

In the Claims

Column 11 Line 31, Claim 12 should read:
12. The pixel structure according to claim 11, wherein
    the second strip electrode(s) and the plate electrode together form a pixel electrode;
    the first strip electrode(s) and the third strip electrode(s) are coupled to together form a common electrode.

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*